Dec. 5, 1939. J. A. ORR Re. 21,289

GRASS CUTTER AND HEDGE TRIMMER

Original Filed May 4, 1936 2 Sheets-Sheet 1

Inventor
J. A. Orr
H. J. Sanders
Atty.

Dec. 5, 1939. J. A. ORR Re. 21,289

GRASS CUTTER AND HEDGE TRIMMER

Original Filed May 4, 1936 2 Sheets-Sheet 2

Inventor
J. A. Orr
By H. J. Sander
Atty.

Reissued Dec. 5, 1939

Re. 21,289

UNITED STATES PATENT OFFICE 21,289

GRASS CUTTER AND HEDGE TRIMMER

John Alexander Orr, Chicago, Ill.

Original No. 2,153,771, dated April 11, 1939, Serial No. 77,661, May 4, 1936. Application for reissue July 17, 1939, Serial No. 284,902

5 Claims. (Cl. 56—25)

This invention relates to improvements in grass cutters and hedge trimmers of a type similar to that in my co-pending application, Ser. No. 4,849, for Electric cutters and trimmers.

One object is to provide a grass cutter and hedge trimmer provided with a knife having blades formed with oppositely disposed cutting edges of identical formation and extent so that one side of the blade will not cut more material than the other.

A further object is to provide a grass cutter and hedge trimmer, motor driven, having novel motor cooling means. A still further object is to provide a machine of this type having means for yieldingly permitting rotation of the knife shaft should the rotary blade strike an unyielding object, thereby preventing breakage of the shaft under such circumstances.

A still further object is to provide a grass cutter and hedge trimmer that will not accumulate sap or collect the material cut by the knife, thus insuring free operation of the knife at all times.

A still further object is to provide a machine of the type having novel knife protecting and guiding means whereby uniform cutting operations along the faces or sides of stones, curbs, and the faces of objects generally may be positively effected. A further object is to provide an electric grass cutter and hedge trimmer having a motor fully shielded from moisture so that short-circuiting during its operation is prevented.

With the foregoing and other objects in view, the invention consists in the combination and arrangement of parts to be hereinafter fully described, pointed out in the claims and illustrated in the accompanying drawings which form a part of this application for patent and in which—

Like reference characters denote corresponding parts throughout the several views.

The present grass cutter and hedge trimmer may be operated from an electric outlet conveniently located, such as an outlet in the garage, a porch outlet, or from outlets disposed any place about the grounds, such as in the yard, in cemetery grounds, etc. or from a portable power plant which is supplied at low cost as a part of one form of the unit.

Figure 1:
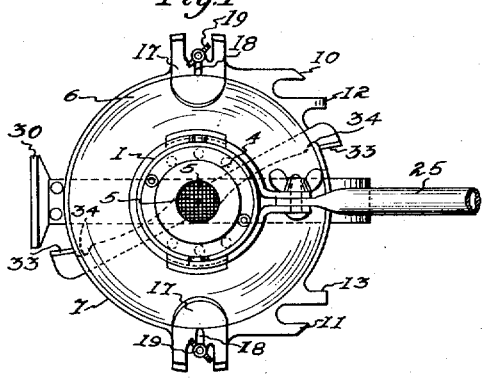
Fig. 1 is a top plan view of the device as a grass cutter.
Figure 4:
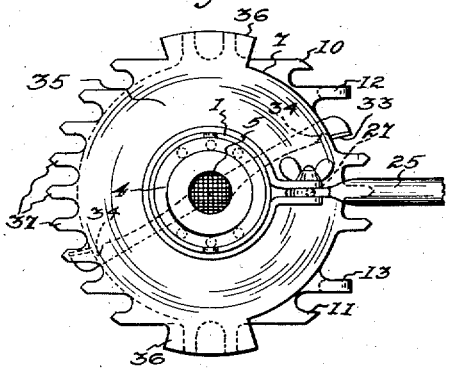
Fig. 4 is a plan view of the device as a hedge trimmer, illustrating a slight modification.
Figure 2:
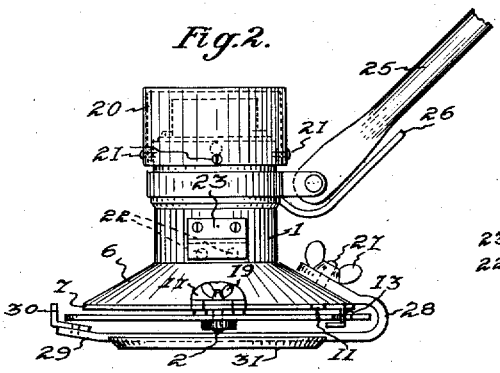
Fig. 2 is a view of Fig. 1 in side elevation.
Figure 5:
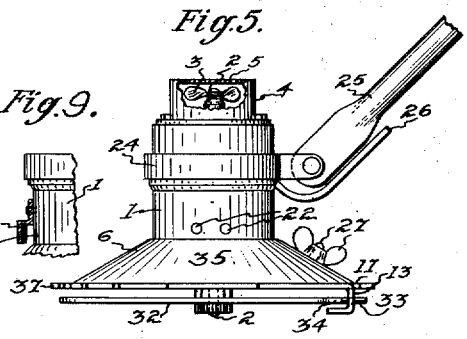
Fig. 5 is a view of Fig. 4 in side elevation.
Figure 9:
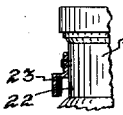
Fig. 9 is a fragmentary view of Fig. 2.
Figure 3:
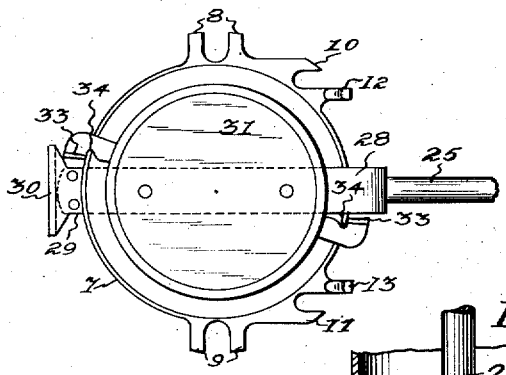
Fig. 3 is an inverted plan view of Fig. 1.
Figure 6:
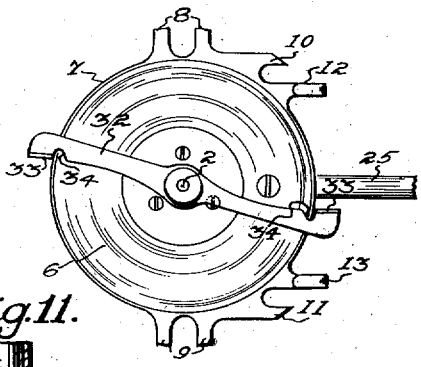
Fig. 6 is an inverted plan view of Fig. 4 with the collar removed.
Figure 10:
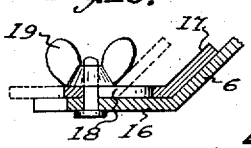
Fig. 10 is a detail view of an adjustable guard shoe illustrating its application.
Figure 11:
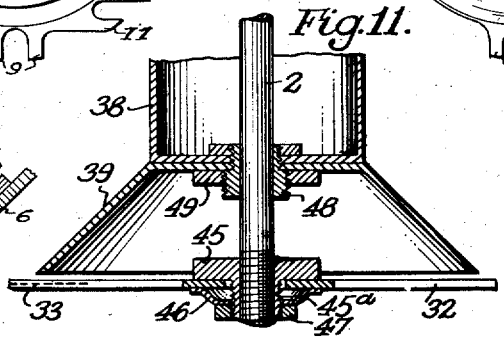
Fig. 11 is a sectional view of Fig. 8.

Referring now to Figs. 1 to 6 inclusive and Figs. 9 and 10, the reference numeral 1 denotes the motor casing containing an electric motor provided with the motor shaft 2 to the upper end of which a small fan 3 is secured inside the casing cap 4 that is perforated in its upper end and therein the screen 5 is fitted, for cooling the motor. The motor casing is formed at its lower end with the flared skirt 6 from the circular terminal edge of which a pair of guard teeth 8 and diametrically opposite thereto a similar pair of guard teeth 9 extend. Upon the same side of the pairs of guard teeth along the edge 7 and adjacent said pairs of teeth respectively are the beveled pointed teeth 10, 11 and spaced therefrom are the downwardly bent guard teeth 12, 13. In use the guard teeth 8 and 9 ride along the lateral face of a stone or curb and serve as a spacer guide for the blade and this in time tends to wear the teeth down. To take care of this, these teeth may be bridged as shown in Fig. 10 to form an ear 16 to which the guard shoe 17 is secured which shoe is formed with an elongated slot 18 through which a bolt secured by the butterfly nut 19 extends and through the ear 16 to adjustably secure the shoe in position. The shoe 17 terminates outwardly in a pair of prongs that ride against a surface in the same manner as the guard teeth 8 or 9 and for the same purpose.

The motor is provided with an inverted cup-shaped hood 20 that fits over its upper end the diameter being somewhat greater than that of the end of the motor casing so that an air space is formed between the wall of the motor casing and the hood, the hood being kept in secured position by the spacer pins or rivets 21 extending through it to the casing. Rotation of the motor fan draws air through the space between the hood and casing, the closed end of the hood being spaced slightly above the upper end of the casing, and the air passes about the motor and out through perforations 22 in the motor casing, well below the hood 20. The hood protects the screened end of the motor casing from moisture when the motor is operated in damp or rainy weather and so prevents short-circuiting of the motor. The perforations 22 in the casing are covered by an angular shield 23 secured to the casing, a portion of this shield being spaced outwardly directly opposite the said perforations to protect them from dust, bits of cut material, moisture and extraneous matter generally which might otherwise clog them.

A metal strap 24 passing about the motor casing has its ends secured to the handle 25 by means of which the device is moved about in use. An electric cord 26 connected to the motor runs to an electric outlet or to the power plant when the same is used. Secured to the skirt 6 of the motor casing by the nut 27 is the angular bracket 28 that extends about the edge 7 and then below the skirt in spaced relation thereto and transversely thereof, the free end 29 extending slightly beyond the edge of skirt 7 and having secured thereto an angular guard hook 30, the free edge thereof being spaced outwardly from the skirt edge 7 and substantially in the plane thereof.

A pan-shaped runner 31 of lesser diameter than the lower edge of the skirt 7 is secured to the bracket 28 for travel over the ground when the device is used as a grass cutter, this pan being spaced below the adjacent end of the motor shaft which shaft end has secured thereto the rotary knife 32 formed at its ends with the cutting edges 33 which are formed upon opposite sides of the blade and are beveled in opposite directions, said cutting edges of the blade being of a common length, each extending from one end of the blade to a blade notch 34, this insuring that one end of the blade will not cut a greater swath than the other. The length of the blade is such that its cutting edges lie beyond the edge 7 of the skirt. The blade is spaced slightly from the skirt end and the cut material will ride clear of the skirt without fouling the same. Referring again to the guard hook 30, the same extends above the edge 7 of the skirt 6 and is disposed beyond the ends of the rotating knife 32 to afford protection for the same. In grass cutting where the grass may grow against a wall or like object, the cutter may be moved over the terrain with the guard hook 30 riding against the wall to protect the knife from the same and at the same time to engage the grass and move the same into contact with the knife to permit it to perform the cutting operation.

When the device is used as a hedge cutter or trimmer, the bracket 28 and pan 31 are detached and the toothed collar 35 applied over the handle and directly upon the skirt 6 and held in place by the same nut 27 used at other times in connection with the bracket 28. The collar 35 is formed with opposed marginal extensions 36 and with a plurality of teeth 37 which cooperate with the teeth 7, 8 of the motor skirt to prevent contact of the knife with stones and like objects that may lie in the path of the device.

Figure 7:
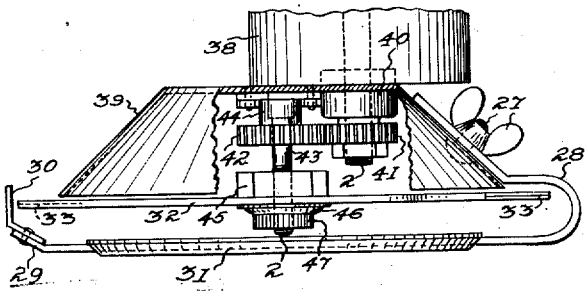
Fig. 7 is a view in side elevation and partly in section of a modified form of the device.

Referring now to Fig. 7 the motor casing 38 is separate from the skirt but bolted thereto, the motor casing being offset with respect to the skirt 39. The motor shaft 2 extends through a ball-bearing housing 40 that extends from the motor casing into the skirt and said shaft has fast thereon a pinion 41 in mesh with a pinion 42 fast upon a shaft 43 arranged in a bearing 44 secured in said skirt, said shaft 43 having the blade 32 secured thereto by means of the nut 45 that is formed with a depending sleeve that is threaded to receive the spring washer 46 pressed against the knife 32 by the nut 47. The nut 45 is detailed in Fig. 8. Should the blade strike an obstruction that would arrest its rotation, the spring washer is sufficiently resilient to permit the shaft to rotate and so avoid shaft breakage. This form of the device is different from the other form only in the pinion driven knife shaft.

Figure 8:
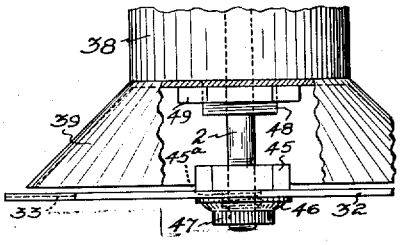
Fig. 8 is a fragmentary sectional view of the device illustrating a novel method of securing the blade to its shaft.

In Fig. 8 the motor shaft 2 extends through a sleeve bearing 48 threaded to receive the nut 49 that secures the skirt to the motor casing. The nut 45 is formed with a sleeve 45a to which the spring washer 46 is secured, said washer being retained in place by the nut 47 so that the knife 32 is secured to the motor shaft for yielding rotation therewith to permit the shaft to continue rotation should the blade strike an object and its rotation be arrested thereby, this construction being the same as that set up in Fig. 7.

In operation the motor is started thus rotating the knife 32 to cut the grass or hedge. When cutting grass the pan 31 rides over the grass spacing the knife a proper distance thereabove. The guard hooks and guard teeth space the device from stones and like objects, curbs, grave markers and the like to prevent contact therewith of the knife, the same being true of the guard shoes 17. The cutter and trimmer may be moved about the tops of bushes by its handle 25, inclined at any angle desired, moved laterally or to or from the operator. Where the skirt is made separate from the motor casting and secured thereto by sleeve 48 and nut 49 the nut may be loosened slightly so that the skirt may be moved around, relative to the casing, so that hedge may be cut with a lateral movement instead of a forward movement as would be necessary if the skirt remained in the position in which it is used for cutting grass.

What is claimed is:

1. In grass cutters and hedge trimmers, a motor casing, a skirt at one end thereof, guard teeth carried by said skirt, and guard shoes secured to said guard teeth and adjustable relative thereto.

2. In a grass cutter and hedge trimmer, a skirt, guard teeth carried thereby, an ear bridging said teeth, and a guard shoe adjustably secured to said ear.

3. In a grass cutter and hedge trimmer, a motor casing, a skirt at one end thereof, an angular bracket secured to said skirt and extending transversely thereof, a pan-shaped runner of lesser diameter than the free end of said skirt secured to said bracket, and a guard hook secured to said bracket and extending upwardly beyond the free edge of said skirt.

4. In a grass cutter and hedge trimmer, a motor casing, a skirt at the lower end thereof, a cutter blade driven by the motor and mounted just below the skirt, a bracket secured to said skirt and extending there-under, a disc-like runner on the bracket and a guard hook on the bracket adjacent the runner, said guard hook adapted to engage the grass growing close to a wall and move the same into contact with the cutter blade.

5. In a grass cutter and hedge trimmer, a motor casing, a skirt at the lower end thereof, a cutter blade driven by the motor and mounted just below the skirt, a bracket secured to said skirt and extending there-under, a disc-like runner on the bracket, a guard hook on the bracket adjacent the runner, said guard hook adapted to protect the blade and also engage the grass growing close to a wall and move the same into contact with the cutter blade, and means for removably securing the runner, the bracket and the guard hook to the skirt.

JOHN ALEXANDER ORR.